J. RICHARDS & W. H. THORNE.
BAND SAWING MACHINE.
No. 104,770.  Patented May 28, 1870.
FIG. 3
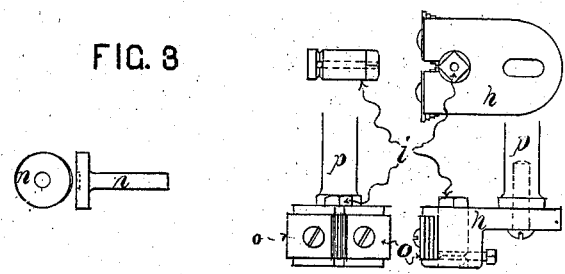
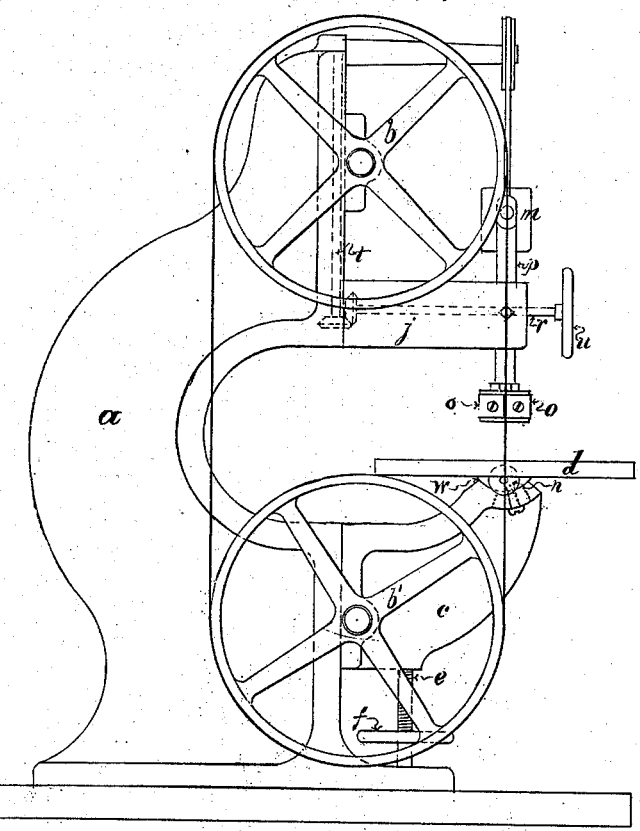
FIG. 1
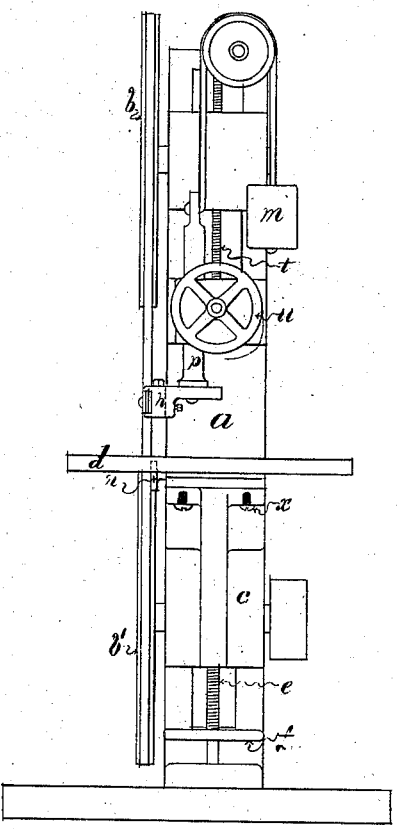
FIG. 2
WITNESSES
Wm S. Kelley
David L. Collier
INVENTORS
John Richards
Wm H. Thorne

United States Patent Office.

JOHN RICHARDS AND WILLIAM H. THORNE, OF PHILADELPHIA, PENNSYLVANIA.

Letters Patent No. 104,770, dated June 28, 1870.

IMPROVEMENT IN BAND SAWING-MACHINE.

The Schedule referred to in these Letters Patent and making part of the same.

We, JOHN RICHARDS and WILLIAM H. THORNE, of the city and county of Philadelphia, have invented certain Improvements in Band Sawing-Machines, of which the following is a specification.

Nature and Objects of the Invention.

The nature of this invention consists—

First, in mounting the table and lower wheel-shaft of a band-sawing machine upon a movable bracket that can be adjusted to various heights from the floor, to suit the depth and character of the work and the convenience of the operator, the same device answering as a means of regulating the tension of the driving-belt; also, in devices for adjusting the table for bevel sawing.

Secondly, it consists in providing a cylindrical support for the back of the saw-blade, made of hardened steel or other suitable material, with its axis parallel to the line of the saw-blade, and in so arranging this cylindrical back-support that any part of the periphery may, by rotating it, be brought in contact with the saw-blade, as hereinafter described.

Thirdly, it consists in combining a counterbalancing weight with guide-stem of band-sawing machines, to facilitate the adjustment of the guides and to prevent their falling when loosened for adjustment, as hereinafter described; and Fourthly, it also consists in providing a revolving disk below the table of band sawing-machines to support the back of the saw, so arranged that it will not be affected by the adjustment of the table for bevel sawing, as hereinafter described; it also consists in providing a convex support for the saw-table, with a long substantial bearing parallel to the top of the table, and held by radial bolts, working in slots through the matrix, so as to allow the table to be moved to various angles for bevel sawing.

The object of the invention will be explained by stating that in band sawing-machines the varying thicknesses of the material to be sawed, as well as the varying stature of the operator, makes it impossible for a manufacturer to adapt his machines to the conditions in each case.

To provide a machine in which the table may be adjusted vertically, and thus meet these conditions, is an object of the invention.

The top of the material being sawed is the standard for height, and, in a machine so constructed, the table can be changed to suit thick or thin material without inconvenience or loss of time, while it provides a ready means of regulating the tension of the driving-belt to suit the depth of the work.

The objects of the devices for adjusting the table to angles are sufficiently well understood by those skilled in the art of sawing.

The great speed at which band-saws run, the thinness of the blade, and the pressure that is brought against the teeth, causes them to rapidly wear away the supports at the back of the saw, cutting into the material, and soon destroying the guide. Rollers, when used to meet this strain, cannot support the saw close to the face of the work, the point of contact being the length of their radius above. To meet these conditions is the object of the cylindrical back-support illustrated, the capacity for wear being as the area of the whole circumference of the cylinder. This cylindrical back-support will last a long time, and can be renewed at a small expense.

The object of the horizontal shaft, connected with the adjusting-screw, is to bring the hand-wheel to a convenient position where it can be operated as the sawing progresses, if necessary, and to prevent danger to the operator in reaching back to the adjusting-wheel.

The object of the counter-weight, applied to the guide-stem, is to secure an easy adjustment of the stem to different heights to suit the depth of the material, and to prevent it, in case of accident, from falling on the table when released by the clamp-screw.

Description of the Accompanying Drawing.

Figure 1 is a side elevation of a band sawing-machine having our improvements;

Figure 2 is a front elevation of the same; and

Figure 3 shows details of the saw-guides.

Similar letters of reference on the different figures indicate corresponding parts.

$a$ is the main frame;

$b\ b'$ are the saw-wheels; and $d$ the table.

$c$ is a movable bracket, on which the table $d$ is supported, also the bearings of the lower wheel-shaft, which are attached to and move with the bracket.

The hand-wheel $f$ and screw $e$ serve to adjust this bracket $c$ and the table $d$ at suitable heights from the floor.

$h$ is a casting bored out to receive the cylindrical back-support $i$ and the lateral guide-plates $o\ o$, and is attached to the guide-stem $p$ by a screw, nut, or tenon, as shown in the drawing, or it may be formed of a single piece with the stem $p$.

$n$ is a back-support below the table, so arranged that its use is not affected when the table is set at an angle for bevel sawing, and is made circular so that it can be revolved at any time, and present a new surface for the back of the saw, and prevent the wearing of grooves in the face by a long action of the saw in one spot.

A guide, with a cylindrical back-support and lateral guide-plates similar to that above, may be applied below the table, and connected with the bracket c, so that it will not be changed in adjusting the angle of the table d. The device illustrated, however, serves for the smaller class of machines.

j is a bracket, bolted to the front of the frame a to support the guide-stem p, and has formed on it bearings to support the horizontal shaft r.

This shaft is connected, by a pair of bevel-gear wheels, with the adjusting-screw t, as shown in dotted lines in fig. 1.

By this means the adjusting-wheel u is brought within easy reach of the operator, and the tension of the saw regulated while the sawing progresses.

The cylindrical back-support i is made of hardened steel or other suitable material. The squared extension on top is made to receive a wrench to revolve it when necessary. This cylindrical back-rest has an oil-way bored down centrally, communicating with the annular groove seen in fig. 3, which serves to oil the saw-blade.

The guide-frame h and stem p are balanced by a weight, m, making the adjustment more convenient and preventing the guide from falling on the table when the clamp-screw y is loosed.

A hollow convex piece, w, is bolted to or cast upon the bottom of the table, and is long enough in the direction of its axis to give a firm support to the t, in the line of the sawing, as well as transversely.

This convex piece w fits into a corresponding cavity formed on the bracket c, and is clamped, by the screw x, at various angles, to suit the character of the work.

Claims.

We claim—

1. The combination of the movable bracket o, with the table and lower wheel of a band sawing-machine, operating substantially as described.

2. The rotating cylindrical back-support i, in combination with a band-saw, arranged and operating substantially as specified.

3. The combination of the counterbalance with the stem p and saw-guide, shown in fig. 3, when operating in the manner herein specified.

4. The saw-support n, when constructed and operating substantially as herein described.

5. The pivoted saw-table and radial fastening-bolts, in combination with the convex piece w and its corresponding matrix, operating substantially in the manner shown.

JOHN RICHARDS.
WM. H. THORNE.

Witnesses:
  GEO. K. CROSS,
  JOS. H. McCARTY.